(12) United States Patent
Farrell et al.

(10) Patent No.: US 10,058,933 B2
(45) Date of Patent: Aug. 28, 2018

(54) ORBITAL CUTTING TOOL HAVING CUTTING EDGES WITH AXIALLY VARYING CIRCUMFERENTIAL SPACING

(71) Applicant: The Boeing Company, Huntington Beach, CA (US)

(72) Inventors: Nicholas Ryan Farrell, Long Beach, CA (US); Wesley Edward Holleman, Long Beach, CA (US); Gary Alan Lipczynski, Garden Grove, CA (US); William P. Zanteson, Monrovia, CA (US)

(73) Assignee: The Boeing Company, Chicago, IL (US)

( * ) Notice: Subject to any disclaimer, the term of this patent is extended or adjusted under 35 U.S.C. 154(b) by 319 days.

(21) Appl. No.: 14/678,895

(22) Filed: Apr. 3, 2015

(65) Prior Publication Data

US 2016/0288222 A1 Oct. 6, 2016

(51) Int. Cl.
*B23C 5/10* (2006.01)
*B23C 3/02* (2006.01)
*B23B 51/04* (2006.01)

(52) U.S. Cl.
CPC ............ *B23C 5/10* (2013.01); *B23C 3/02* (2013.01); *B23B 51/04* (2013.01); *B23C 2210/0492* (2013.01); *B23C 2210/246* (2013.01); *B23C 2210/282* (2013.01); *B23C 2220/52* (2013.01); *B23C 2226/27* (2013.01)

(58) Field of Classification Search
CPC ............. B23C 5/10; B23C 2210/0492; B23C 2210/282; B23C 2220/52
See application file for complete search history.

(56) References Cited

U.S. PATENT DOCUMENTS

| 1,948,057 | A  | 2/1934  | Tscherne |
| 4,963,059 | A  | 10/1990 | Hiyama |
| 5,071,294 | A  | 12/1991 | Suzuki et al. |
| 6,773,211 | B2 | 8/2004  | Zackrisson et al. |
| 6,997,651 | B2 | 2/2006  | Kawai et al. |
| 7,367,754 | B1 | 5/2008  | Greenwood et al. |

(Continued)

FOREIGN PATENT DOCUMENTS

| DE | 1177904 B   | * | 9/1964  | ............ B23C 5/003 |
| DE | 29715192 U1 | * | 12/1997 | ............ B23C 5/003 |

OTHER PUBLICATIONS

English Translation of DE 1177904 B, Sep. 1964.*
Netherlands Enterprise Agency, Search Report and Written Opinion in Netherlands' Patent Application No. 2016502, dated Feb. 21, 2017, 10 pages.

(Continued)

*Primary Examiner* — Alan Snyder
(74) *Attorney, Agent, or Firm* — Kolisch Hartwell, P.C.

(57) ABSTRACT

A cutting tool for use in an orbital drilling machine may include a cutting-tool body having a longitudinal axis and a plurality of cutting edges supported on the cutting-tool body and distributed circumferentially around the cutting-tool body. Each cutting edge may extend along the longitudinal axis in a respective helix. A circumferential spacing may be defined between each pair of circumferentially adjacent cutting edges for each position of the longitudinal axis along which the cutting edges extend. The circumferential spacing between at least first and second cutting edges of the plurality of cutting edges may be different at spaced-apart first and second positions along the longitudinal axis.

8 Claims, 1 Drawing Sheet

(56) References Cited

U.S. PATENT DOCUMENTS

| | | |
|---|---|---|
| 7,431,538 B1 | 10/2008 | Ni et al. |
| 7,627,940 B2 | 12/2009 | Amirehteshami et al. |
| 7,905,687 B2 | 3/2011 | Dufour et al. |
| 7,959,382 B2 | 6/2011 | Volokh et al. |
| 8,602,698 B2 | 12/2013 | Craig et al. |
| 8,714,890 B2 | 5/2014 | Davancens et al. |
| 8,858,129 B2 | 10/2014 | Craig |
| 8,926,236 B2 | 1/2015 | Kauper et al. |
| 2004/0057803 A1 | 3/2004 | Walrath |
| 2004/0120777 A1 | 6/2004 | Noland |
| 2006/0188346 A1 | 8/2006 | Greenwood et al. |
| 2012/0051863 A1 | 3/2012 | Craig et al. |
| 2015/0020649 A1 | 1/2015 | Sampath |

OTHER PUBLICATIONS

Ginger Gardiner, Orbital Drilling enables "one-up assembly", CompositeWorld E-Newsletter, URL: http://www.compositesworld.com/articles/orbital-drilling-enables-one-up-assembly, Sep. 2012, 8 pages.

Widia, Solid End Milling Catalogue, URL: http://www.widia.com/content/dam/kennametal/widia/common/resources/downloads/literature/WIDIA%20Catalogs/WIDIA%20Advances%202012%20Catalog/WIDIA%20Advances%202012%20Catalog%20-%20INCH%20-%20Sections%20to%20download/A-10-02470_Advances2012_C1-05_SolidEndmills_minch.pdf, 2012, 6 pages.

Widia, Solid End Milling VariMill™ Mini Catalogue, URL: http://www.itc-ltd.co.uk/images/catalogues/WIDIA_VariMill_WEB_2014.pdf, © 2013, 44 pages.

* cited by examiner

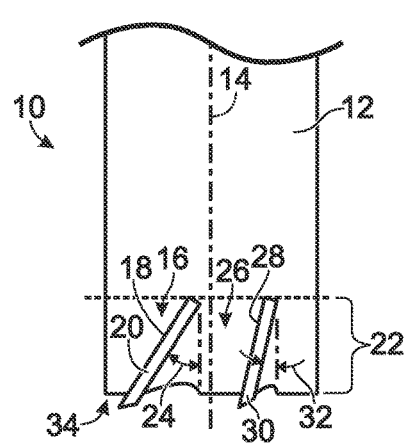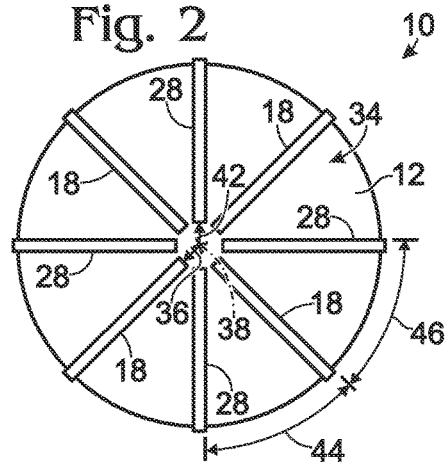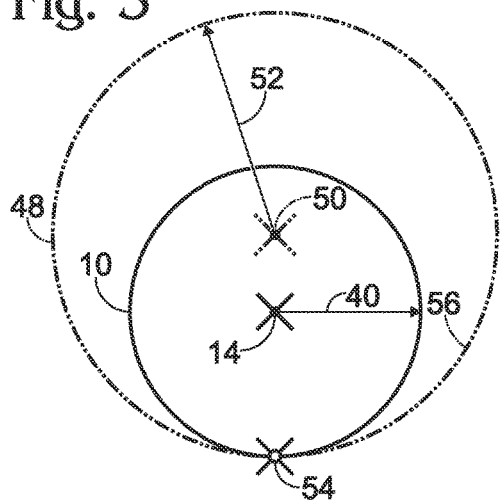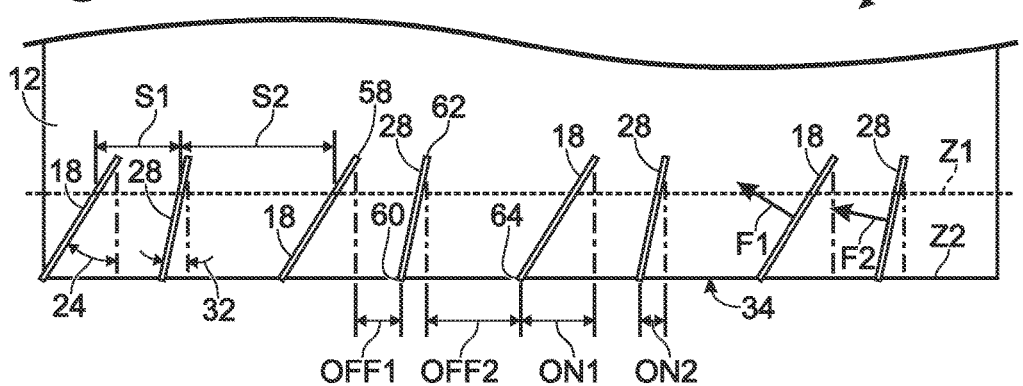

US 10,058,933 B2

ORBITAL CUTTING TOOL HAVING CUTTING EDGES WITH AXIALLY VARYING CIRCUMFERENTIAL SPACING

INTRODUCTION

Advanced composite materials, such as carbon fiber-reinforced polymers, may be used in the aeronautics industry and other industries. Components of aircraft can be constructed from sheets of composite materials, either alone or as part of a stack of different layers, including titanium, steel, or aluminum. To attach these components to a structure of the aircraft, holes may be drilled through the component.

Orbital drilling may be used to drill through single-component materials and "stack-ups" of different materials. In conventional drilling a drill bit or cutting tool is pushed through a material as the tool spins on its own longitudinal axis. Thus, a hole created with conventional drilling will have the same diameter as the drill bit that created it. In contrast, in orbital drilling the drill bit or cutting tool rotates on its own longitudinal axis while at the same time that longitudinal axis rotates or "orbits" around the center of the hole being created in addition to being fed through a material. Thus, a hole created with orbital drilling may have a larger diameter than the drill bit that created it. Orbital drilling has numerous advantages over conventional drilling, including less clean-up, the ability to make holes with a range of diameters using the same tool, generation of smaller chips and less heat, and the ability to drill through a variety of different materials and stacks of materials.

During orbital drilling it is possible for resonances to develop through "resonant coupling" where the workpiece or machine tool system has a natural vibration frequency that is driven by the cutting tool. This leads to vibrations, or "chatter," of the workpiece and/or the drilling machine. One method to partially disrupt this resonant coupling is to have an unequal spacing between adjacent cutting edges as they wind in a helical fashion around the shaft of the cutting tool. For example, if a cutting tool has a set of four cutting edges disposed around its circumference, there are four circumferential spaces that are each defined between adjacent cutting edges. If the cutting edges are spaced at regular intervals around the circumference then the spacing between the cutting edges will also be regular. Thus, there would be a regular frequency at four times the rotational frequency of the cutting tool that could couple to a natural vibration frequency of a workpiece. By modifying the spacing between the cutting edges to, for example, short-long-short-long this timing is partially disrupted. Cutting tools that use this method maintain the same unequal spacing between the respective cutting edges along the length of the cutting portion of the tool.

SUMMARY

The present disclosure describes a cutting tool comprising a cutting-tool body extending along a longitudinal axis and at least one first cutting edge supported on the cutting-tool body. In some embodiments, the at least one first cutting edge extends along the longitudinal axis in a first helix at a first helix angle relative to the longitudinal axis at each position along at least a portion of the longitudinal axis. The cutting tool includes at least one second cutting edge supported on the cutting-tool body. The at least one second cutting edge extends along the longitudinal axis in a second helix at a second helix angle relative to the longitudinal axis at each position along the portion of the longitudinal axis. The second helix angle is different than the first helix angle.

In some embodiments, a cutting tool or drill bit includes a cutting-tool body having a longitudinal axis and a plurality of cutting edges supported on the cutting-tool body. The plurality of cutting edges are distributed circumferentially around the cutting-tool body and each cutting edge extends along the longitudinal axis in a respective helix. A circumferential spacing is defined between each pair of circumferentially adjacent cutting edges for each position of the longitudinal axis along which the cutting edges extend. The circumferential spacing between at least first and second cutting edges of the plurality of cutting edges is different at spaced-apart first and second positions along the longitudinal axis.

In some embodiments, a method of drilling and/or reaming a hole in a part formed of at least one material includes rotating a cutting tool having a plurality of cutting edges supported on a cutting-tool body. The cutting edges extend along a longitudinal axis and the plurality of cutting edges are distributed circumferentially around the cutting-tool body, each cutting edge extending along the longitudinal axis in a respective helix. A circumferential spacing is defined between each pair of circumferentially adjacent cutting edges for each position of the longitudinal axis along which the cutting edges extend. The circumferential spacing between at least first and second cutting edges of the plurality of cutting edges is different at spaced-apart first and second positions along the longitudinal axis. The method of drilling and/or reaming a hole in a part formed of at least one material includes moving the rotating cutting tool into contact with the at least one material such that the cutting edges contact the at least one material in succession during each rotation of the cutting tool.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a schematic side elevational view of an example of a cutting tool.

FIG. 2 is a schematic end view of the cutting tool of FIG. 1.

FIG. 3 is a simplified axial view of the cutting tool of FIG. 1 and a hole that could be created by the cutting tool during orbital drilling.

FIG. 4 is a simplified side elevational view of the cutting tool of FIG. 1, with the side face unwrapped into a two-dimensional diagram to show the entire circumference of the tool.

FIG. 5 is a flow chart depicting an example of a method of drilling and/or reaming a hole using the cutting tool of FIG. 1.

DETAILED DESCRIPTION

An embodiment of an alternating helix orbital cutting tool is described below and illustrated in the associated drawings. Unless otherwise specified, an alternating helix orbital cutting tool and/or its various components may, but is not required to, contain at least one of the structure, components, functionality, and/or variations described, illustrated, and/or incorporated herein. The following description of the embodiment is merely exemplary in nature and is in no way intended to limit the disclosure, its application, or uses. Additionally, the advantages provided by the embodiment, as described below, are illustrative in nature and not all embodiments provide the same advantages or the same degree of advantages.

Cutting tools or drill bits may be used in an orbital drilling machine. Such cutting tools may have two or more cutting edges that wind in a helical fashion around a body of the cutting tool, where the circumferential spacing between the cutting edges may vary axially. For example, two or more of the cutting edges may extend along helix angles that are different than each other. In some examples, a cutting tool may have a plurality of cutting edges, half of which extend along a first helix angle and the other half of which extend along a second helix angle different from the first helix angle. The cutting edges with different helix angles may alternate circumferentially around the cutting-tool body. This alternating pattern may inhibit the timing of the application of forces by the cutting tool to the workpiece being cut and the direction of the forces. This may reduce or prevent the creation of resonant vibrations in the cutting tool or workpiece. Methods and apparatus described may be particularly suitable for drilling through workpieces that are composed of layers of different materials.

FIGS. 1-4 depict various aspects of an example of helix orbital cutting tools. FIG. 1 is a schematic side elevational view of an example of a cutting tool, generally indicated at 10. Cutting tool 10 includes a cutting-tool body 12 that extends along a longitudinal axis 14 corresponding to a center line of the cutting tool 10. Cutting tool 10 has a plurality of cutting edges disposed circumferentially around the cutting tool 10. The term "circumferential" is taken to indicate a direction around the cutting tool that is neither the longitudinal nor the radial direction. Each of these cutting edges extends along the longitudinal axis 14 in a continuous path, such as a path having the shape of a helix that may extend partially around the longitudinal axis 14.

Cutting tool 10 includes a first cutting flute 16 and at least one first cutting edge 18 supported on cutting-tool body 12. The at least one first cutting edge 18 extends along the longitudinal axis 14 in a continuous line, such as along a first helix 20. That is, cutting edge 18 may extend along the longitudinal axis 14 while at the same time wrapping around the longitudinal axis 14 of the cutting-tool body 12. In this example, at each position along at least a portion 22 of the longitudinal axis 14, the first cutting edge 18 extends at a first helix angle 24 with respect to the longitudinal axis 14. The first cutting flute 16 may be a channel adjacent to at least one first cutting edge 18. Thus, the first cutting flute 16 may facilitate the removal of material that has been cut out of the workpiece by the first cutting edge 18. First cutting flute 16 may further provide space for various coolant or lubrication fluids to flow to the at least one first cutting edge 18.

Cutting tool 10 includes a second cutting flute 26 and a least one second cutting edge 28 supported on the cutting-tool body 12. The at least one second cutting edge 28 extends along the longitudinal axis 14 in a second helix 30. The second cutting edge 28 may extend along the cutting-tool body 12 for the same portion 22 of the longitudinal axis 14 as the first cutting edge 18. That is, the lengths of the first cutting edge 18 and second cutting edge 28, measured in a direction parallel to the longitudinal axis 14, may be the same. The lengths of the first and second cutting edges 18 and 28 may also be different. At each position along the portion 22 of the longitudinal axis 14, the second cutting edge 28 may extend at a second helix angle 32 relative to the longitudinal axis 14. The second helix angle 32 is different than the first helix angle 24 and one or both of the respective helix angles 24 and 32 may vary along their lengths.

FIG. 1 shows two cutting edges 18 and 28 and is intended to be schematic and exemplary and not limiting in any way. The number of cutting edges that are visible in a side view of an embodiment of a cutting tool 10 may depend on the total number of cutting edges, the relative spacing of the cutting edges around the cutting-tool body 12, and the lengths of the cutting edges, which lengths are determined in this example by the helix angles of the respective cutting edges 18 and 28. Any number of cutting edges may be visible or partially visible in a side view of an embodiment of a cutting tool 10, including two cutting edges, more than two cutting edges, or less than two cutting edges. By depicting two cutting edges 18 and 28, FIG. 1 indicates that there may be cutting edges with different helix angles and thereby axially varying spacing between circumferentially adjacent cutting edges on the same cutting tool 10.

FIG. 2 is a simplified schematic bottom view of cutting tool 10. Cutting-tool body 12 may have a cutting end 34 and the cutting edges 18 and 28 may extend onto the cutting end 34. Cutting tool 10 is shown in FIG. 2 to have eight cutting edges, but this number is meant to be exemplary and should not be taken to be limiting in any way. Cutting tool 10 may have any appropriate number of cutting edges. More generally, cutting tool 10 may have a first plurality of cutting edges including first cutting edge 18. Some or all of the cutting edges in the first plurality of cutting edges 18 may extend along the cutting-tool body 12 at the same first helix angle 24. In the exemplary and non-limiting embodiment shown in FIG. 2, the first plurality of cutting edges 18 is four cutting edges 18. The cutting edges 18 in the first plurality of cutting edges 18 may extend to a first inner radius 36 on the cutting end 34. The first inner radius 36 may be zero, that is, the first plurality of cutting edges may extend to a center 38 of cutting end 34. The first inner radius 36 may also have any non-zero value smaller than the outer radius 40 of the cutting-tool body 12.

Cutting tool 10 may have a second plurality of cutting edges including second cutting edge 28. Some or all of the cutting edges 28 in the second plurality of cutting edges 28 may extend along the cutting-tool body 12 at the same second helix angle 32. In the exemplary and non-limiting embodiment shown in FIG. 2, the second plurality of cutting edges 28 is four cutting edges 28. However, the number of cutting edges 28 in the second plurality of cutting edges 28 need not be the same as the number of cutting edges 18 in the first plurality of cutting edges 18. The cutting edges 28 in the second plurality of cutting edges 28 may extend to a second inner radius 42 on the cutting end 34. The second inner radius 42 may be zero, that is, the second plurality of cutting edges may extend to the center 38 of cutting end 34. The second inner radius 42 may also have any non-zero value smaller than the outer radius 40 of the cutting-tool body 12. The second inner radius 42 may be the same or different than the first inner radius 36.

The first and second cutting edges 18 and 28 on cutting end 34 may extend in a substantially radial fashion as indicated in FIG. 2, that is, along straight lines that extend from proximate the center 38 of the cutting end 34 to the outer radius 40. However, the cutting edges 18 and 28 on cutting end 34 may not extend along radial lines but along some other lines transverse with respect to radial lines. If the cutting edges 18 and 28 do not extend along radial lines on cutting-tool end 34, the different cutting edges may not be angled uniformly with respect to radial lines.

In an exemplary embodiment of cutting tool 10, the cutting edges 18 and 28 may be disposed at equal circumferential intervals around the cutting-tool body 12 at one axial position of the cutting tool 10. FIG. 2 shows the cutting edges 18 and 28 disposed regularly about the cutting end 34. The cutting edges 18 and 28 extend from the cutting end 34 along the cutting-tool body 12. That is, there may be a first circumferential interval 44 between two adjacent cutting edges and a second circumferential interval 46 between the next two adjacent cutting edges around the cutting-tool body 12. The first and second circumferential intervals 44 and 46 may be the same on the cutting end 34.

FIG. 2 also illustrates by the positions of the outer ends of the respective cutting edges 18 and 28, the first cutting edges 18, which extend along the cutting-tool body 12 at the first helix angle 24, alternating circumferentially around the cutting tool 10 with the second cutting edges 28, which extend along the cutting-tool body 12 at the second helix angle 32. In this example, there are the same number of cutting edges disposed at each of the two helix angles 24 and 32, and the helix angle alternates from one cutting edge to the next. In some examples, a plurality of circumferentially adjacent cutting edges may have the same configuration, such as extending along the same helix angle. For example, if the total number of cutting edges extending at the first helix angle 24 is different from the total number of cutting edges extending at the second helix angle 32 then there will be at least two circumferentially adjacent cutting edges having the same cutting edge configuration. Even if the numbers of cutting edges disposed along each of the different helix angles are the same, the cutting edges with different angles may be disposed in some manner besides alternating, such as having two cutting edges with the same helix angle adjacent each other. Further, the angles of the cutting edges may all be different, and the cutting edges may extend along lines that vary from particular angles along the lengths of the cutting edges.

FIG. 3 is a simplified schematic top view of cutting tool 10 and an outline of a hole 48 that could be created by the cutting tool 10 in a workpiece made of one or more layers of materials. FIG. 3 illustrates orbital drilling. Cutting tool 10 may rotate on its own longitudinal axis 14 while at the same time the longitudinal axis 14 may rotate or orbit around a center or hole axis 50 of the hole 48 that is being created. If the longitudinal axis 14 and the hole axis 50 maintain a constant separation between them, then the hole 48 created may be generally circular. The rotational speed of the cutting tool 10 about its own longitudinal axis 14 may be greater than the rotational speed of the longitudinal axis 14 about the hole axis 50. As an outer radius 40 of cutting tool 10 may be smaller than a hole radius 52 of the hole 48 being created by the cutting tool 10, theoretically there may be only one point of contact 54 between the cutting tool 10 and the sidewall 56 of hole 48 at any one time. As the longitudinal axis 14 orbits around the hole axis 50, the point of contact 54 will correspondingly move around sidewall 56. While hole 48 is shown to be generally circular, it will be apparent to those skilled in the art that a variety of shapes could be created by orbital drilling with cutting tool 10.

FIG. 4 is a simplified side elevational view of cutting tool 10, "unwrapped" to show the entire circumference of the cutting tool 10 and the configuration of the cutting edges 18 and 28. Other details of the cutting tool 10 have been omitted to facilitate a description of the cutting edge configurations. That is, FIG. 4 depicts all sides of cutting tool 10 in a two-dimensional image, where the left side of FIG. 4 is contiguous with the right side of FIG. 4 for the three-dimensional cutting tool 10. Continuing the non-limiting example described in reference to FIGS. 1 and 2, cutting tool 10 may have a first plurality of cutting edges, including the first plurality of first cutting edges 18, extending in helixes along the cutting-tool body 12 at first helix angle 24. Cutting tool 10 may include the second plurality of second cutting edges 28, extending in helixes along the cutting-tool body 12 at second helix angle 32. As discussed in reference to FIG. 2, there may be the same number or different numbers of cutting edges having the different configurations along the longitudinal axis 14. For example, the cutting edges with different helix angles may be disposed in an alternating configuration or a non-alternating configuration around the circumference of the cutting-tool body 12.

In the exemplary embodiment shown in FIG. 4, cutting tool 10 has four first cutting edges 18 at the first helix angle 24 alternating with four second cutting edges 28 at the second helix angle 32. In this embodiment, the cutting edges may be regularly spaced around the cutting end 34. However, because of the different angles of the first and second helixes, the circumferential spacing between circumferentially adjacent cutting edges varies as the axial distance from the cutting end 34 increases. Cutting tool 10 may have a first circumferential spacing or interval S1 between two adjacent cutting edges 18 and 28 and a second circumferential spacing or interval S2 between the next two adjacent cutting edges 28 and 18 at a given axial position Zn. For example, at a first axial position Z1 along cutting-tool body 12, the circumferential spacings S1 and S2 may be different. In this example, the first circumferential spacing S1 is smaller than the second circumferential spacing S2. In another embodiment, the first circumferential spacing S1 may be larger than the second circumferential spacing S2 at axial position Z1.

At a second axial position Z2 spaced apart from the first axial position Z1, the first and second circumferentially spacings S1 and S2 may be the same, and they are both different from the spacings S1 and S2 at axial position Z1. That is, there may exist an axial position in the portion 22 of the longitudinal axis 14 where the cutting edges 18 and 28 of the first and second pluralities of cutting edges 18 and 28 are disposed at equal circumferential intervals around the cutting-tool body 12. It can be seen that the spacings S1 and S2 vary with position along the longitudinal axis 14. For example, if the first helix angle 24 is larger than the second helix angle 32 and the different helix angles 24 and 32 alternate around the cutting-tool body 12. Further, when the first circumferential spacing S1 is smaller than the second circumferential spacing S2 at axial position Z1 as depicted in FIG. 4, then the first circumferential spacing S1 may be larger at an axial position closer to cutting end 34, such as at axial position Z2 proximate cutting end 34, than at axial position Z1. Similarly, second circumferential spacing S2 may be smaller at axial position Z2 than the circumferential spacing S2 at axial position Z1, which is farther away from cutting end 34. The circumferential spacing between the first and second cutting edges 18 and 28, for example spacing S1, may be different at each axial position along a length of the longitudinal axis 14 between the first and second axial positions Z1 and Z2. The circumferential spacing may vary progressively or linearly from a first spacing at the first axial position Z1 to a second spacing at the second axial position Z2.

If cutting tool 10 is being used to create a hole 48 that has a larger diameter than cutting tool 10 itself, as shown in FIG. 3, then there may only be one point of contact 54 between the cutting tool 10 and the sidewall 56 of the hole 48 at any one time. Considering the configuration of cutting edges 18 and 28 shown in FIG. 4 and depending on the relative geometries of the cutting tool 10 and the hole 48 being cut, only one of the cutting edges 18 and 28 may be engaged with the sidewall 56 of the hole 48 at any one time. In other embodiments, more than one of cutting edges 18 and 28 may be engaged with the sidewall 56 of the hole 48 at any one time.

First cutting edge 18 may have a first engagement length ON1 and second cutting edge 28 may have a second engagement length ON2, where ON1 and ON2 represent the portion of a rotation or circumference in which the particular cutting edge is in contact with the material being cut. If the first helix angle 24 is larger than the second helix angle 32, as is shown in FIG. 4, and the longitudinal extent of the first and second cutting edges 18 and 28 are the same, then the first engagement length ON1 may be larger than the second engagement length ON2.

As the cutting tool 10 rotates on its longitudinal axis 14 and the longitudinal axis 14 orbits around the hole axis 50 locations on the cutting edges 18 and 28 of cutting tool 10 will have a linear speed as they move through the point of contact 54 between the cutting tool 10 and the sidewall 56 of the hole 48. The first and second cutting edges 18 and 28 may thus have first and second engagement times defined by the first and second engagement lengths ON1 and ON2 divided by this linear speed. The first and second engagement times may be described by the amount of time that the first and second cutting edges 18 and 28 spend engaged with the sidewall 56 of the hole 48 as the cutting tool 10 operates. The first and second engagement times may be different from each other, depending on the configuration of each respective cutting edge 18 and 28.

As can be seen in FIGS. 3 and 4, in the example illustrated there will be times when neither cutting edge 18 or 28 is engaging the sidewall 56 of the hole 48 as cutting tool 10 is operated. Cutting tool 10 may have a first disengagement length OFF1 and a second disengagement length OFF2. The first disengagement length OFF1 may be the shortest circumferential distance between a distal end 58 of a first cutting edge 18 and a proximal end 60 of a second cutting edge 28. The second disengagement length OFF2 may be the shortest circumferential distance between a distal end 62 of a second cutting edge 28 and a proximal end 64 of a first cutting edge 18.

As the cutting tool 10 rotates and orbits, the point of contact 54 moves through the first and second disengagement lengths OFF1 and OFF2 at a linear speed as described in reference to the first and second engagement lengths ON1 and ON2. Cutting tool 10 may have first and second disengagement times defined by the first and second disengagement lengths OFF1 and OFF2 divided by this linear speed. The first and second disengagement times may be described as the two periods of time that no first or second cutting edge 18 or 28 of cutting tool 10 engages the sidewall 56 of the hole 48. The two disengagement times may be the same or different, or there may be no disengagement times, depending on the configurations and relative positions of the cutting edges 18 and 28.

As the cutting edges 18 and 28 engage intermittently the sidewalls 56 of the hole 48 being created by cutting tool 10, the cutting edges 18 and 28 correspondingly apply forces intermittently to the workpiece being cut. The cutting edges 18 and 28 can apply normal forces which are perpendicular to the interface between cutting edges 18 and 28 and the workpiece, that is, perpendicular to the cutting edges 18 and 28 themselves. Cutting edges 18 and 28 can also apply frictional forces that are parallel to the cutting edges 18 and 28 as the cutting edges 18 and 28 cut through the material of the workpiece. The net result is a force applied by each cutting edge 18 and 28 as it moves in contact with the material being cut.

For example, first cutting edge 18 may produce a first force directed in a first direction represented by arrow F1 transverse to the line of the first cutting edge 18 and illustrated as being perpendicular to the first cutting edge 18 disposed at first helix angle 24. If the angle the first cutting edge 18 makes is first helix angle 24 with respect to the longitudinal axis 14, the first force may generally be directed at an angle equal to 90 degrees minus the first helix angle 24, with respect to the longitudinal axis 14. A second cutting edge 28 may produce a second force directed in a second direction represented by arrow F2 transverse to the line of the second cutting edge 28 and illustrated as being perpendicular to the second cutting edge 28 disposed at the second helix angle 32. If the angle the second cutting edge 28 makes with respect to the longitudinal axis 14 is second helix angle 32, the direction represented by arrow F2 of the second force may generally extend at an angle equal to 90 degrees minus the second helix angle 32, with respect to the longitudinal axis 14.

As the first and second helix angles 24 and 32 may be different, the directions of the first and second forces may be different. Thus the forces applied to the workpiece by the first and second cutting edges 18 and 28 may also be different in either magnitude or direction or in both magnitude and direction.

Cutting tool 10 may have first and second engagement times associated with the first and second engagement lengths ON1 and ON2 of first and second cutting edges 18 and 28, respectively and associated disengagement times associated with the first and second disengagement lengths OFF1 and OFF2. As the cutting tool 10 operates, the first and second cutting edges 18 and 28 are engaged with the sidewall 56 of the hole 48 during the first and second engagement times separated in time by the associated disengagement times. During these engagement times, the cutting edges 18 and 28 apply forces to the workpiece, and any vibrations of the workpiece could be considered to be driven oscillations. If, for example, the first engagement time, or a cycle time from one first engagement time to the next, is equal to or similar to a natural vibrational timescale of the workpiece, there may be resonant coupling between the cutting tool 10 and the workpiece. However, if the second engagement time, or a cycle time from one second engagement time to the next, is different from the first engagement time as described above, then the resonant vibration created during the first engagement time is immediately inhibited when the second cutting edge 28 engages with the workpiece, as the timescale of the driving force will have changed. The same is true if, for example, the second engagement time or the cycle time from one second engagement time to the next, is equal to or similar to a natural vibrational timescale of the workpiece. Resonant coupling achieved during the second engagement time is inhibited during the next pass of a cutting edge 18 lasting the duration of the first engagement time.

The exemplary embodiment depicted in FIGS. 1-4 has different cutting edges 18 and 28 with different helix angles 24 and 32 disposed in an alternating fashion circumferentially around the cutting-tool body 12. This arrangement may be effective at inhibiting resonant vibrations as resonant coupling is immediately inhibited by the pass of the next cutting edge. However, other arrangements of the cutting edges 18 and 28 besides alternating may also be effective.

Even if, for example, all cutting edges 18 with the first helix angle 24 are adjacent, and all cutting edges 28 with the second helix angle 32 are adjacent, any resonant coupling will terminate before a single full rotation of the cutting tool 10 is completed. Similarly, if the cutting edges of cutting tool 10 have more than two different angles or have other configurations in which the spacing between the cutting edges varies along their lengths, natural resonances may be inhibited.

As discussed in reference to FIG. 4, cutting tool 10 may have first and second disengagement times, associated with first and second disengagement lengths OFF1 and OFF2, described by the times when no cutting edges are engaged with the sidewall 56 of the hole 48. During these times the cutting edges 18 and 28 are not applying forces to the sidewall 56 of the hole 48, and any vibrations of the workpiece could be considered to be undriven oscillations. If a workpiece is oscillating at one of its natural frequencies and, for example, the first disengagement time is equal to or similar to the natural vibrational timescale of the oscillation, then the natural oscillation may complete one full oscillation during the first disengagement time.

On the other hand, if the first disengagement time is unequal to the natural vibrational timescale of the oscillation, then the natural oscillation could complete a non-integer number of full cycles, and the oscillation is inhibited by the reengagement of a cutting edge. Similarly, the second disengagement time can either cooperate with or inhibit a natural vibration of the workpiece if the second engagement time is similar to or dissimilar from the natural vibration timescale of the workpiece, respectively. By having both first and second disengagement times present during every rotation of the cutting tool 10, any natural vibration that is enhanced during one of the disengagement times may be inhibited during the other disengagement time. As with the first and second engagement times, the cutting edges 18 and 28 with different helix angles 24 and 32 need not be distributed in an alternating fashion around the circumference of the cutting-tool body 12 in order for the natural vibrations to be inhibited by the unequal disengagement times.

As noted previously, a single object can have a set of natural vibrational timescales, with different timescales associated with different kinds of oscillation and oscillations in different directions. Forces are vectors and have a magnitude and a direction. Natural oscillations may have a particular associated direction and may only be induced by forces applied in a particular direction. If a natural vibration of an object is induced by an applied force directed at a particular angle, then another force directed at a different angle may inhibit that natural vibration. For example, if a first force applied in the direction of the first arrow F1 associated with the first cutting edge 18, see FIG. 4, leads to a resonant coupling between the cutting tool 10 and the workpiece, then a second force applied in the direction of the second arrow F2 may inhibit that resonant coupling. Similarly, if a first force applied in the direction of second arrow F2 leads to a resonant coupling between the cutting tool 10 and the workpiece, then a second force applied in the direction of the first arrow F1 may inhibit that resonant coupling. As with the first and second engagement times, the cutting edges 18 and 28 with different helix angles 24 and 32 may be arranged in different circumferential positions in addition to alternating positions and also produce the two different forces having the directions of arrows F1 and F2 in a manner effective for inhibiting or disrupting resonant vibrations.

The example of cutting tool 10 shown in FIGS. 1, 2 and 4 has cutting edges 18 and 28 at first and second helix angles 24 and 32. However, other configurations also may disrupt or inhibit resonant vibrations. Cutting tool 10 may include a third cutting edge disposed on the cutting-tool body 12 and extending along the longitudinal axis 14 in a third helix. At each position along the portion 22 of the longitudinal axis 14, the third cutting edge may extend at a third helix angle different than the first and second helix angles 24 and 32 relative to the longitudinal axis 14. Cutting tool 10 may then have a third engagement time and a third disengagement time, both of which may be different than either of the first and second engagement and disengagement times, which may disrupt or inhibit resonant vibrations of the workpiece. Cutting tool 10 may have as many different helix angles as there are cutting edges. That is, every cutting edge may have a different helix angle. Or, for example, if the number of cutting edges on cutting tool 10 is some number N, then the number of different helix angles may be a number between 2 and N, including 2 and N.

More generally, cutting tool 10 may include at least three cutting edges including the at least first and second cutting edges 18 and 28. Each cutting edge may be supported on the cutting-tool body 12 and extending along the longitudinal axis 14 in a respective helix. At each position along the portion 22 of the longitudinal axis 14, the respective cutting edge may extend at a respective helix angle different than the respective helix angles of the other cutting edges.

As has been mentioned, cutting tool 10 may be used to drill and/or ream a hole 48 in a workpiece. FIG. 5 is a flow chart depicting a method, generally indicated at 70, of drilling and/or reaming a hole 48 in a workpiece formed of at least one material using a cutting tool, such as cutting tool 10 shown in FIGS. 1-4.

At step 72, a cutting tool 10 having a plurality of cutting edges 18 and 28 with different spacings S1 and S2 between the cutting edges 18 and 28 at different axial positions Z1 and Z2 is rotated. The cutting tool 10 may have a longitudinal axis 14, and the rotation of step 72 may be about the longitudinal axis.

At step 74, the rotating cutting tool 10 is moved into contact with at least one material. When the cutting edges 18 and 28 extend onto a cutting end 34 of the cutting tool 10, the cutting edges 18 and 28 on the cutting end 34 may contact the material one after the other or concurrently as the cutting tool 10 rotates 72 and the cutting tool 10 is moved 74 into contact with at least one material. The rotating cutting tool 10 may be moved 74 into contact with the at least one material such that the cutting edges 18 and 28 contact the at least one material in succession during each rotation of the cutting tool 10. While the cutting tool 10 rotates 72 on its longitudinal axis 14, and the cutting tool 10 is moved laterally with respect to the longitudinal axis 14, such as by revolving the cutting tool about a hole axis 50 while maintaining contact between the cutting tool 10 and the material. Thus, the longitudinal axis 14 may move in a circle as the cutting tool 10 rotates around the longitudinal axis 14 and the cutting tool 10 may create a hole 48 in the material that has a larger radius 52 than the radius 40 of the cutting tool 10. If the cutting tool 10 is creating a hole 48 or reaming a hole that had been previously created, there may only be one point of contact 54 between the cutting tool 10 and a sidewall 56 of the hole 48 at any one time. As the cutting tool 10 rotates 72, the cutting edges 18 and 28, disposed circumferentially around the cutting-tool body 12, make intermittent, successive contacts with the sidewall 56 of the hole 48.

Additionally, and among other benefits, illustrative embodiments of the cutting tool 10 described herein may provide a relatively smooth finish on the sidewall 56 of the hole 48 created by the cutting tool 10. Employing a cutting tool 10 with axially varying spacings between adjacent cutting edges, such as cutting edges disposed at different helix angles, may eliminate further processing of the sidewall 56 forming the hole 48.

It will be appreciated that the specific embodiment of a cutting tool 10 as disclosed and illustrated herein may have different features, some examples of which have been described. The embodiments described are not to be considered in a limiting sense, because numerous variations are possible. The following claims particularly point out certain combinations and subcombinations regarded as novel and nonobvious. Invention(s) embodied in other combinations and subcombinations of features, functions, and/or elements may be claimed in applications claiming priority from this or a related application. Such claims, whether directed to a different invention or to the same invention, and whether broader, narrower, equal, or different in scope to the original claims, also are regarded as included within the subject matter of the invention(s) of the cutting tool 10 and its use.

We claim:

1. A cutting tool comprising:
    a cutting-tool body having a longitudinal axis and a cutting end; and
    at least four cutting edges supported on the cutting-tool body and distributed circumferentially around the cutting-tool body, each cutting edge extending along the longitudinal axis in a respective helix, a circumferential spacing being defined between each pair of circumferentially adjacent cutting edges for each position of the longitudinal axis along which the cutting edges extend, the circumferential spacing between at least first and second cutting edges of the at least four cutting edges being different at spaced-apart first and second positions along the longitudinal axis;
    wherein each of the at least four cutting edges extends to a respective non-zero inner radius on the cutting end of the cutting-tool body, the first cutting edge extends to a first inner radius on the cutting end of the cutting tool body, and the second cutting edge extends to a second inner radius on the cutting end of the cutting tool body which is different than the first inner radius.

2. The cutting tool of claim 1, wherein the circumferential spacing between the at least first and second cutting edges is different at each position along a length of the longitudinal axis between the first and second positions along the longitudinal axis.

3. The cutting tool of claim 2, wherein the circumferential spacing between the at least first and second cutting edges varies progressively from a first spacing at the first position along the longitudinal axis and a second spacing at the second position along the longitudinal axis.

4. The cutting tool of claim 1, wherein the first cutting edge is disposed at a first helix angle relative to the longitudinal axis and the second cutting edge is disposed at a second helix angle relative to the longitudinal axis, the first and second helix angles being different.

5. A method of drilling and/or reaming a hole in a part formed of at least one material, the method comprising the steps of:
    rotating a cutting tool according to claim 1; and
    moving the rotating cutting tool into contact with the at least one material such that the cutting edges contact the at least one material in succession during each rotation of the cutting tool.

6. The method of claim 5, wherein rotating the cutting tool includes rotating the cutting tool with the circumferential spacing between the at least first and second cutting edges being different at each position along a length of the longitudinal axis between the first and second positions along the longitudinal axis.

7. The method of claim 6, wherein rotating the cutting tool includes rotating the cutting tool with the circumferential spacing between the first and second cutting edges varying progressively from a first spacing at the first position along the longitudinal axis to a second spacing at the second position along the longitudinal axis.

8. The method of claim 7, wherein rotating the cutting tool includes rotating the cutting tool with the first cutting edge disposed at a first helix angle relative to the longitudinal axis and the second cutting edge disposed at a second helix angle relative to the longitudinal axis, the first and second helix angles being different.

* * * * *